US008235697B2

(12) United States Patent
Olin et al.

(10) Patent No.: US 8,235,697 B2
(45) Date of Patent: Aug. 7, 2012

(54) INJECTION MOLD WITH INDUCTIVE HEATING

(75) Inventors: Stefan Olin, Spanga (SE); Jan Jaederberg, Spanga (SE)

(73) Assignee: Thermal Cyclic Technologies TCTech I Stockholm AB, Spanga (SE)

( * ) Notice: Subject to any disclaimer, the term of this patent is extended or adjusted under 35 U.S.C. 154(b) by 410 days.

(21) Appl. No.: 12/469,341

(22) Filed: May 20, 2009

(65) Prior Publication Data
US 2009/0239023 A1 Sep. 24, 2009

Related U.S. Application Data

(63) Continuation-in-part of application No. PCT/EP2007/009978, filed on Nov. 19, 2007.

(30) Foreign Application Priority Data

Nov. 21, 2006 (EP) ..................................... 06124467

(51) Int. Cl.
*B29C 45/73* (2006.01)
(52) U.S. Cl. .......... 425/174.8 R; 425/174.8 E; 425/547; 425/548
(58) Field of Classification Search ........... 425/174.8 R, 425/174.8 E, 547, 548
See application file for complete search history.

(56) References Cited

U.S. PATENT DOCUMENTS

| 6,599,376 | B2 * | 7/2003 | Morikawa et al. | 148/306 |
| 7,981,350 | B2 * | 7/2011 | Jaderberg et al. | 425/547 |
| 2004/0188427 | A1 | 9/2004 | Huang | |
| 2006/0081615 | A1 * | 4/2006 | Kataoka et al. | 219/622 |
| 2008/0203088 | A1 * | 8/2008 | Kinouchi et al. | 219/619 |
| 2010/0000980 | A1 * | 1/2010 | Popescu | 219/201 |
| 2010/0052667 | A1 * | 3/2010 | Kohama et al. | 324/239 |

FOREIGN PATENT DOCUMENTS

| JP | 6-8250 A | 1/1994 |
| JP | 2005-335234 A | 12/2005 |

* cited by examiner

*Primary Examiner* — Tim Heitbrink
(74) *Attorney, Agent, or Firm* — Birch, Stewart, Kolasch & Birch, LLP

(57) ABSTRACT

An injection-molding device includes at least first and second mould parts, defining a mould cavity, wherein at least one of the mould parts includes a heating device, for heating the mould part in the vicinity of a mould cavity surface, the heating device includes an inductive coil having a plurality of windings and being powered by an oscillator. The heating device further comprises a thin top member, which functions as a susceptor for electromagnetic energy emitted by the inductive coil, which is placed in grooves in a carrier member. An intermediate member is placed between the top member and the carrier member. The intermediate member does not function as a susceptor to any grater extent, but provides mechanical stability while allowing the heat generation to be concentrated to the top member.

22 Claims, 4 Drawing Sheets

INJECTION MOLD WITH INDUCTIVE HEATING

CROSS-REFERENCE TO RELATED APPLICATIONS

This application is a Continuation-In-Part of copending PCT International Application No. PCT/EP2007/009978 filed on Nov. 19, 2007, which designated the United States and on which priority is claimed under 35 U.S.C. §120. This application also claims priority to Application No. 06124467.9, filed in Europe on Nov. 21, 2006. The entire contents of each of the above applications are hereby incorporated by reference.

TECHNICAL FIELD

The present invention relates to an injection-molding device, comprising at least first and second mould parts, defining a mould cavity, wherein at least one of the mould parts comprises heating means, for heating the mould part in the vicinity of a mould cavity surface, said heating means comprising an inductive coil having a plurality of windings and being powered by an oscillator. The invention also relates to a tool for forming a surface.

BACKGROUND OF THE INVENTION

Such an injection-molding device is disclosed in, e.g. U.S. Pat. No. 4,563,145. This document describes a molding block for manufacturing flat information carriers from thermoplastic material. The molding block comprises a glass plate, wherein a copper pipe is embedded. The copper pipe can be used both as a cooling channel and an inductive coil. On top of the glass plate, a ferro-magnetic material layer is placed, which absorbs some of the energy emitted from the coil. On top of the ferromagnetic layer, a copper layer is placed, having high thermal conductivity. The copper layer conducts the generated heat to a surface layer in the mould part.

This device may thus be used both to actively heat and cool the mould, which provides for shorter process cycles and/or improved process yield.

An improved and more efficient heating functionality is however needed to further improve an injection molding process.

SUMMARY OF THE INVENTION

An object of the present invention is therefore to provide an injection molding device with improved active heating capability. This object is achieved by means of an injection molding device comprising at least first and second mould parts, defining a mould cavity, wherein at least one of the mould parts comprises heating means, for heating the mould part in the vicinity of a mould cavity surface, said heating means comprising an inductive coil having a plurality of windings and being powered by an oscillator. The mould part comprises a top member, at the mould cavity surface, a carrier member, placed beneath the top member as seen from the cavity surface and comprising grooves for accommodating said coil windings, and an intermediate member placed between the top member and the carrier member, wherein the top member has a resistivity lower than $1.5*10^{-6}$ $\Omega m$, the carrier member has a relative magnetic permeability higher than 50, and a resistivity higher than $20*10^{-6}$ $\Omega m$, and the intermediate member has a resistivity higher than $20*10^{-6}$ $\Omega m$ and a relative magnetic permeability lower than 1.2.

In this configuration, the top member can be made very thin, since the intermediate member can provide the necessary rigidity while not functioning as a susceptor for electromagnetic energy to any greater extent. As the top member can be made thin, the development of heat may be concentrated to a region close to the mould cavity surface, thus providing efficient heating. Additionally, the top member may be provided in a ferromagnetic material.

The grooves in the carrier member may be arranged to convey a coolant. The thermal conductivity of the intermediate member may then be higher than 10 W/mK, thus very efficiently transporting heat from the mould cavity surface when the mould is to be cooled.

The intermediate member may comprise a ceramic material, such as Aluminum Nitride, AlN, Boron Carbide, $B_4C$, Silicon Nitride, $Si_3N_4$, Titanium Diboride, $TiB_2$, or Aluminum Oxide, $Al_2O_3$. Many of those materials have a resistivity that is significantly higher than the aforementioned $20*10^{-6}$ $\Omega m$; for example, $Al_2O_3$. has a resistivity of about $10^{12}$ $\Omega m$.

A backing member may be placed behind the carrier member as seen from the cavity surface and the coil may have return windings that are placed between the carrier member and the backing member. The top member may then have a resistivity higher than $0.05*10^{-6}$ $\Omega m$ (i.e. in the interval $0.05*10^{-6}$-$1.5*10^{-6}$ $\Omega m$), and the backing member may have a resistivity lower than $0.05*10^{-6}$ $\Omega m$.

The elasticity modulus of the intermediate member may be 200 GPa or higher.

The relative magnetic permeability of the top member may be higher than 1.2, as the top member can be made thin.

The top member may be solid or laminated.

If the top member is laminated an upper top member layer may comprise a material with a relative magnetic permeability higher than 1.2 and a lower top member layer may comprise a material with a relative magnetic permeability lower than 1.2.

Additionally, the intermediate member may comprise grooves facing the grooves of the carrier member.

According to another aspect of the invention, there is provided a tool for forming a surface, comprising heating means for heating the tool in the vicinity of a tool surface, said heating means comprising an inductive coil having a plurality of windings and being powered by an oscillator; a top member at the tool surface; a carrier member, placed behind the top member as seen from the surface to be formed, and comprising grooves for accommodating said coil windings; and an intermediate member placed between the top member and the carrier member, wherein the top member has a resistivity lower than $1.5*10^{-6}$ $\Omega m$,
the carrier member has a relative magnetic permeability higher than 50, and a resistivity higher than $20*10^{-6}$ $\Omega m$, and
the intermediate member has a resistivity higher than $20*10^{-6}$ $\Omega m$ and a relative magnetic permeability lower than 1.2.

The top member may be electrically connected to a backing member, that may be located behind the carrier member, as seen from the surface to be formed.

A method for injection molding or surface forming may use an injection-molding device or a surface forming tool, respectively, as defined above and may be used to produce e.g. optical information carriers and lightguide plates.

DETAILED DESCRIPTION

Figure 1:
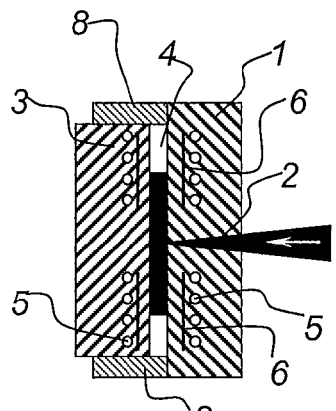
FIGS. 1-4 illustrate schematically an injection-molding process cycle where active cooling and heating is used.

There will now be described examples of injection-molding devices.

FIGS. 1-4 describe schematically steps in an injection-molding process utilizing an injection molding device. More particularly, an injection compression cycle is schematically illustrated.

In the injection-molding device, a first mould part 1 is fixed and comprises a resin injecting nozzle 2, which is fed by an extruder. Together with a second, moveable mould part 3 and a sub-part 8 on the second moveable part 3, the first mould part forms a cavity 4. The first and second mould parts further include means, in the form of coolant ducts 5, for cooling the mould parts in the vicinity of the cavity 4. Additionally, the first and second mould parts 1, 3 include means, in the form of inductor coils 6, for heating the mould parts in the vicinity of the cavity 4.

In the injection step, illustrated in FIG. 1, the heating means 6 are activated so as to heat the mould parts 1, 3 while hot resin is injected into the cavity 4. The first and second mould parts are separated, but the cavity 4 is closed by means of the sub-part 8 on the second mould part 3. An amount of resin, suitable for finally filling the cavity, is injected between the mould parts 1, 3. The sub-part 8 can slide to some extent in the axial direction in relation to the second mould part 3, and may be provided as a ring surrounding the cavity and defining the periphery of the same, such that the resin does not escape through the gap between the mould parts. Air may still escape through a small gap between one of the mould parts and the sub-part as the resin is injected. This gap may be e.g. 10 μm wide.

Figure 2:
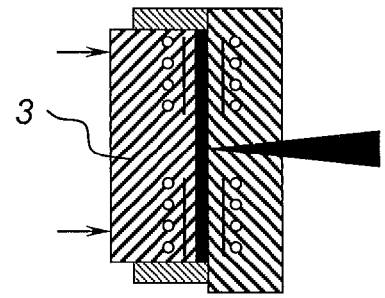

In FIG. 2, the injection phase has been completed, and a clamping force is applied to the second, moveable mould part 3 in order to press the second part 3 towards the first mould part 1. This serves to make the resin fill the cavity entirely and to replicate any surface structure e.g. on the second mould part 3 on the corresponding surface of the injected resin. The injected resin takes up the greater part of the applied force, thanks to the moveable sub-part 8. The second mould part moves slightly towards the first mould part also after the cavity is completely filled, to compensate for the shrinking of the resin as the resin gets cooler. The heating of the mould may be switched off before or during this phase of the cycle.

Figure 3:
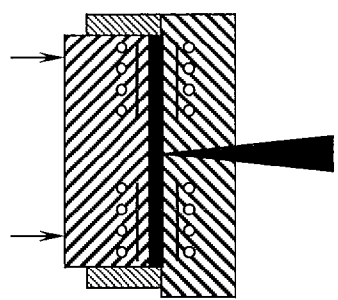

In FIG. 3 the resin is cooled by the coolant, which may flow continuously through the ducts throughout the process cycle. The clamping force is still applied during this phase.

Figure 4:
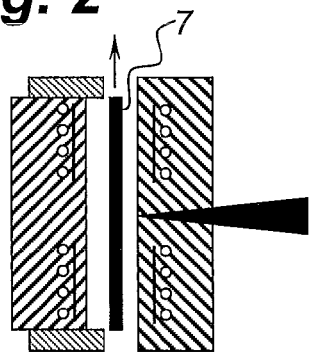

In FIG. 4 finally, the produced object 7 has reached a temperature that is low enough to remove the object from the cavity. The mould parts are therefore separated to make the cavity accessible, and the produced object is removed. Already at this stage the heating of the mould parts may be resumed to prepare the mould for the next production cycle.

The above described cycle may be called "injection compression" and is useful e.g. for the purpose of replicating fine surface structures on a finished product. The invention to be described would however also be useful for so-called "straight injection" cycles, where the mould parts are in a fully closed state, with applied clamping force, as the resin is injected, and no particular clamping step is used. No sub-part (8 as in FIGS. 1-4) is thus needed, and the cavity may be defined entirely by the forms of a first and second mould part. The shrinking may then be compensated for by means of resin injected by the extruder to which the nozzle is connected.

In the disclosed example, active heating of the mould part/s takes place. In general, active heating allows shorter cycle times and the production of thinner structures with greater surfaces. Additionally, cooling channels may be placed closer to the cavity surface or thermally quicker materials may be used, both in terms of thermal conduction and specific heat, close to the cavity surface. Lower clamping forces may be used with maintained replication performance.

Figure 5:
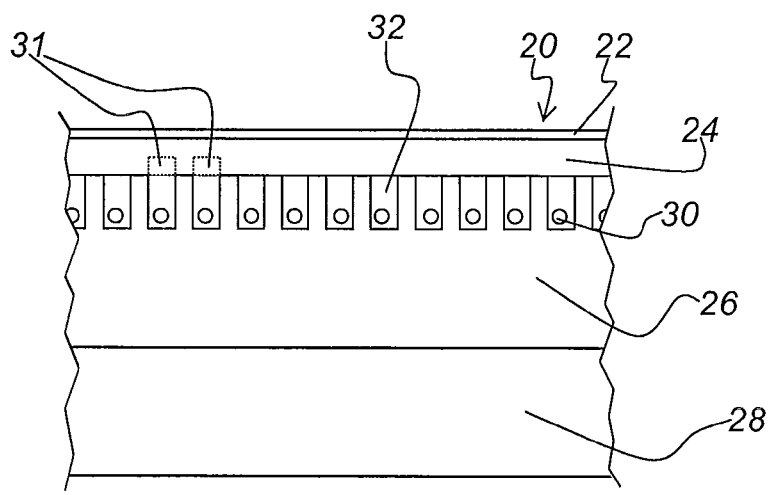
FIG. 5 shows a cross section of a mould part.

FIG. 5 shows a cross section of a mould part at a cavity surface. In the following, the term "top" generally refers to parts closer to the mould cavity, i.e. closer to the object that is being formed by the mould part or surface forming tool, than the term "bottom", irrespective of the actual orientation of the injection molding device. The mould part of FIG. 5 has been designed to achieve a development of thermal energy which is to a great extent concentrated to an area close to the cavity surface 20. Starting from the cavity surface 20, the mould part has a top member 22, an intermediate member 24, a carrier member 26, comprising a coil 30, and a backing member 28.

The top member 22 functions as a susceptor for an oscillating electromagnetic field generated by the coil 30, i.e. develops thermal energy when exposed to the field. As will be described further, the top member 22 may be solid or laminated.

The development of thermal energy raises the temperature of top member as the electromagnetic field is generated. To some extent, this effect may be due to magnetic hysteresis in the top member 22 material, but in most cases, induced eddy currents provide the greater part of the developed thermal energy.

Since eddy currents are affected by the skin effect, the top member may in these cases be thin, less than about 1 mm thick. If e.g. a 1 cm top member would be used in order to provide a very stiff structure, a great part of the thermal energy would be developed from eddy currents close to the bottom surface of the top member, at a distance from the mould cavity surface. Even if some of this energy would be conveyed to the top surface during the heating part of the cycle, the efficiency of such an arrangement may be too low. Thanks to the use of an intermediate member, as will be described below, it is however possible to use a thin top member structure.

In order to function well as a susceptor, the top member 22 should comprise an electrically conductive material with a resistivity at least lower than $1.5*10^{-6}$ Ωm. As regards the relative magnetic permeability, the top member may be chosen freely. In general, a high relative permeability will have the effect that the eddy currents to a greater extent are induced close to the bottom surface of the top part. This may as mentioned be detrimental for the efficiency if the top member is very thick.

However, in this case a thin ferromagnetic top member may be used as this entails a high and rapid thermal power development at the mould cavity surface.

On the other hand, equalization of the heat profile takes place if energy is transported through the top member, which may be positive, as will be discussed later. There thus exists a tradeoff for the top member thickness which is to be regarded when determining the thickness depending on the application.

Suitable top member materials include ferrite and austenitic type steels (e.g. STAVAX ESR or GRIPER, sold by Uddeholm Tooling AB of Hagfors, Sweden), or other electrically conductive ferromagnetic or non-ferromagnetic materials such as e.g. Nickel.

The carrier member 26 comprises grooves 32 that are open towards the cavity surface and contain coil winding turns. The carrier member material has a high relative magnetic permeability, at least 50 at the relevant temperatures, in order to efficiently form a part of a magnetic circuit around each winding turn. The open grooves serve not to short-circuit these magnetic circuits. By relevant temperatures is here meant temperatures occurring in the relative section of the mould part during the process cycle. The windings may comprise litz wires.

While having a high relative permeability, the carrier part should at the same time have a high resistivity, at least higher than $20*10^{-6}$ Ωm. This serves to avoid that thermal energy is developed in the carrier part 26 to any greater extent, instead focusing the temperature increase at the mold cavity surface. A suitable material is Permedyn™ MF1, which is a soft magnetic composite, including ferromagnetic, electrically insulated particles. Wall parts between adjacent grooves 32 in the carrier member may be dimensioned under consideration of the saturation level of the used material.

The grooves 32 may at the same time be used to convey a coolant, such as water, which is used to cool the mold part during a part of the production cycle. The coil windings may then be placed at the far end of the grooves, as seen from the cavity surface, in order provide a coolant flow closer to the top member 22.

The intermediate member 24 is used to provide a mechanical stiffness which allows the top part 22 to be thin. At the same time, the intermediate member should not to any greater extent itself function as a susceptor, thereby concentrating the heating to the top member 22 when the electromagnetic field is applied. Thus, materials with high resistivity, low relative magnetic permeability and high elasticity modulus are preferred. The resistivity may be higher than $20*10^{-6}$ Ωm and the relative magnetic permeability lower than 1.2. The required elasticity modulus depends on the thickness of the intermediate layer as well as the mechanical stresses to which the top member 22 and the intermediate member 24 are exposed, and on other geometric properties, such as the width of the grooves in the carrier member. It has been found that an elasticity modulus of about 200 GPa is sufficient in most cases. As illustrated in FIG. 5, grooves 31 may also be provided in the intermediate member 24, facing the grooves 32 of the carrier member 26. Greater overall cooling ducts may thus be achieved, or alternatively the groove depth in the carrier member may be reduced with maintained cross-section.

During a process cycle, a clamping pressure as high as 45 MPa may, in conventional injection molding devices, be applied on the injected resin by the mold parts. However, the active heating/cooling allows the clamping pressure to be substantially reduced. Additionally, the bearing distance over a carrier member groove is typically only about 2.5 mm.

Figure 6:
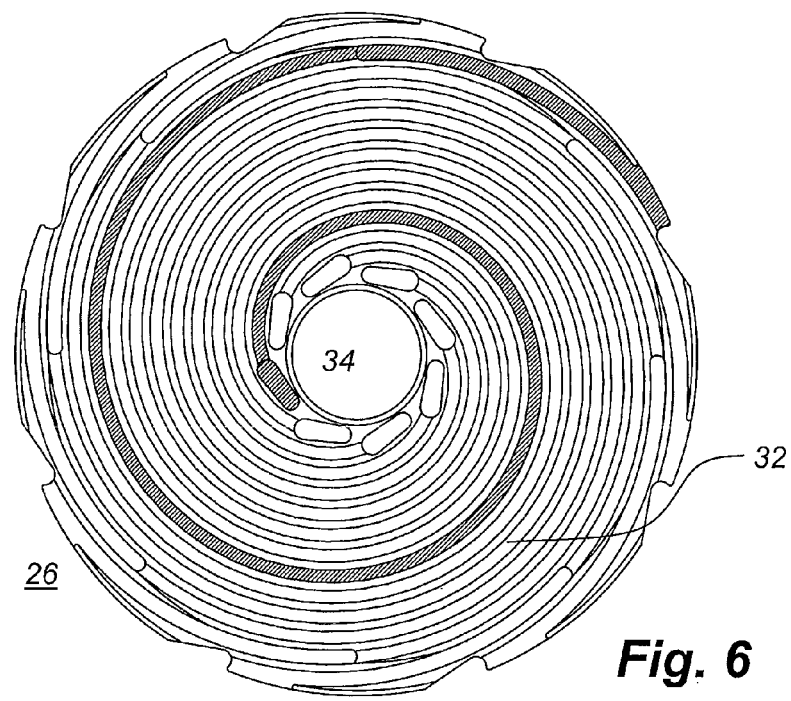
FIG. 6 shows a front view of a carrier member.

If the grooves in the carrier member are used to convey a coolant, the pressure of that coolant is applied on the other side of the intermediate member 24, and this pressure may be applied over a greater bearing distance, greater than the radius of the mould surface as illustrated by the carrier member in FIG. 6. Therefore, the coolant pressure may in many cases determine the required stiffness of the intermediate member 24.

If the grooves in the carrier member are used to convey a coolant, an intermediate member with good thermal conductivity provides improved cooling of the top member during the phase when the mold is cooled. Further, the intermediate member may be capable of sealing the grooves too enclose the coolant in a groove, even if some leakage of coolant between adjacent grooves may be allowed.

In the intermediate member, ceramic materials such as Aluminum Nitride, AlN, Boron Carbide, $B_4C$, Silicon Nitride, $Si_3N_4$, or Titanium Diboride, $TiB_2$, may be used. Sintered Aluminum Oxide, $Al_2O_3$, may also be considered. Generally, a thermal conductivity higher than 10 W/mK in the intermediate is preferred.

The backing member 28 is situated behind the carrier member 26 as seen from the mould cavity surface. As will be illustrated later, return winding parts of the coil windings 30 are placed between the carrier member 26 and the backing member 28, and therefore the backing member 28 may preferably be made in a material that avoids excessive development of thermal energy due to the return windings. The backing member may therefore have a low resistivity (e.g. $<0.03*10^{-6}$ Ωm), preferably lower than the top member resistivity. A low relative magnetic permeability (<1.2) is further preferred.

Figure 7:
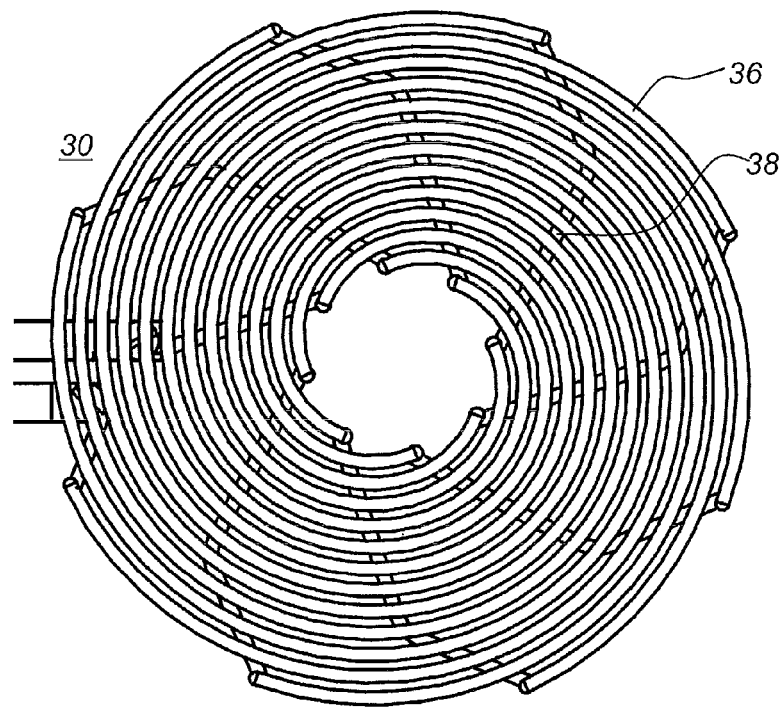
FIG. 7 illustrates an exposed winding as wound in the carrier member of FIG. 6.

FIG. 6 shows a front view of a circular carrier member, and FIG. 7 illustrates exposed a winding as wound in the carrier member of FIG. 6. In the illustrated mould part, the coil 30 is wound in eight turns around the carrier member 26, which has a central opening 34. The upper part of each turn 36, as seen from the mould cavity, extends in a groove 32, formed as an Archimedean spiral, from the periphery of the carrier member to the central opening 34. The bottom part 38 of each turn extends in a comparatively short path, between the carrier member and the backing member, from the central opening to the periphery of the carrier member.

The backing member 28 and the top member 22 may be in galvanic contact, electrically connected at the central opening 34 and at the periphery of the carrier member 26. This closes the eddy current loops in the radial direction and avoids any risk of the build-up of excessive voltages at these locations due to the applied oscillating field.

Figure 8:
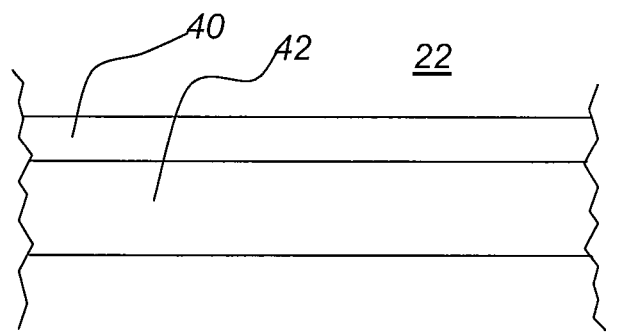
FIG. 8 shows a cross section through a laminated top member.

FIG. 8 shows a cross section through a laminated top member. In this case, the top member comprises an upper layer 40 and a lower layer 42. The upper layer may typically comprise a stamper, that is used to generate a surface pattern on the injected resin. If the lower layer functions as a susceptor, the upper layer may be chosen also in a material that does not exhibit good susceptor properties. The upper layer may be replaced, e.g. when a new pattern should be printed.

Further, if a large proportion of the thermal energy is developed in the lower top member layer and the heat is conducted through the upper layer to the cavity surface, the upper top member layer functions as a sort of low-pass filter, equalizing the temperature both over time and over the cavity surface. This may be used to avoid excessive temperature variations at the cavity surface that may be caused by e.g. the spacing between the coil turns. A laminated top member may therefore be useful even in cases where separate stampers are not used. One useful configuration is to have a ferromagnetic upper layer (relative magnetic permeability higher than 1.2) and a non-ferromagnetic lower top member layer (relative magnetic permeability lower than 1.2).

Three or more layers in the top member may also be considered.

Figure 9:
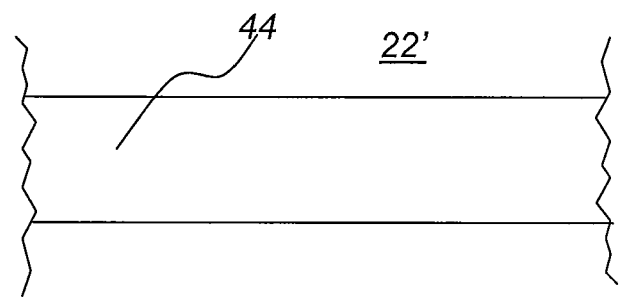
FIG. 9 shows a cross section through a solid top member.

FIG. 9 shows a cross section through a solid top member 22', comprising a single layer 44. Such a top member may of course be less complex to manufacture. It has been considered to use a solid top member with an integrated stamper. Such a top member may be made in a ferromagnetic material, e.g. in nickel.

The mould part may thus have the following exemplary configuration having eight winding turns and being powered by a 40 kHz impulse:

| Part | Operating temperature | Material | Dimensions |
| --- | --- | --- | --- |
| Top member, 1st layer (stamper) | 20-350° C. | Nickel | 0.3 mm thick |
| Top member, 2nd layer | 20-350° C. | Griper | 0.5 mm thick |
| Intermediate member | 20-350° C. | Silicon Nitride, $Si_3N_4$ | 4 mm thick |
| Carrier member | 20-170° C. | MF1 | 16 mm thick; 2.5 mm wide and 6.25 mm deep grooves at c-c distance 6 mm |
| Backing member | 20-170° C. | Copper | 8 mm thick |

The described injection-molding device may be useful for producing a variety of different products. A part from information carriers such as CDs and DVDs and sub-layers of such items, e.g. lightguide plates may be produced. The mould cavity surfaces may have different shapes. As an example, FIG. 10 illustrates a rectangular carrier member 26, carrying a coil 6 having a plurality of windings 30.

Figure 10:
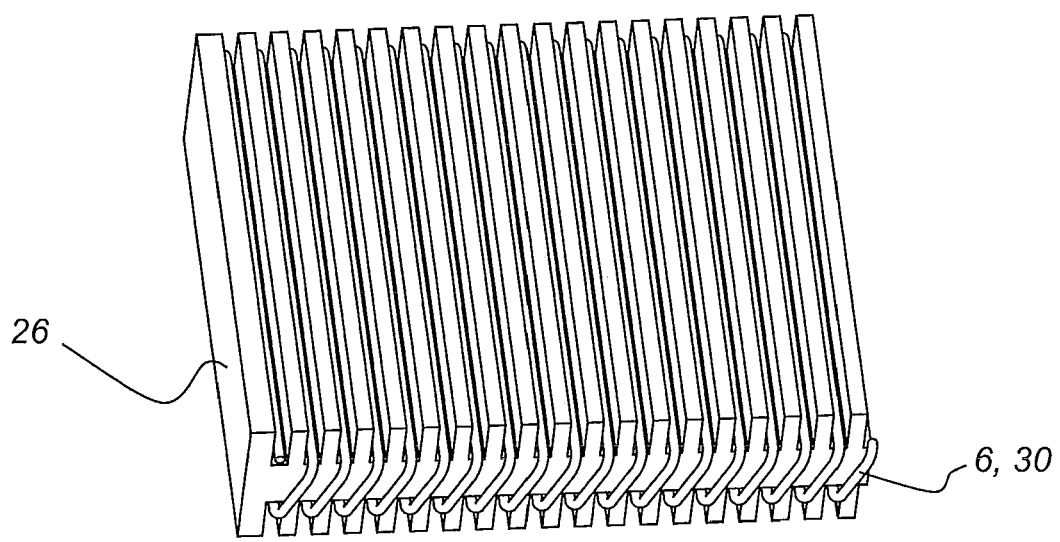
FIG. 10 illustrates a rectangular carrier member and a coil in perspective.
Figure 11:
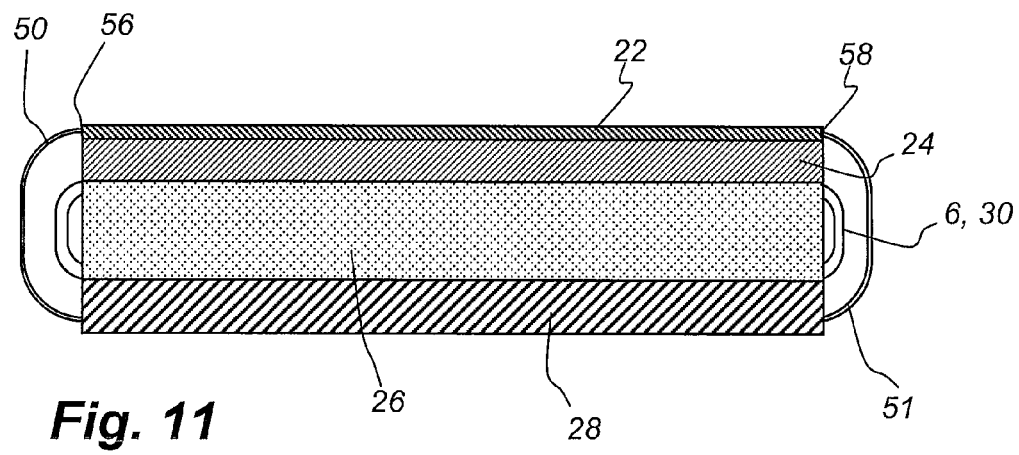
FIG. 11 is a side view of a mould part comprising the carrier member and coil of FIG. 10.

As a person skilled in the art readily appreciates, a carrier member such as the one illustrated in FIG. 10, when placed within a coil 6, forms an inductor core that will direct electromagnetic flux primarily in a plane parallel to the plane of the top member. This means that when using a carrier member 26 according to the geometry illustrated in FIG. 10, i.e. when using a geometry of the coil 6 that will induce an average current from a first edge 56 (FIG. 11) to a second edge 58 of a top member 22, a proper galvanic contact between the top member 22 and a backing member 28 is particularly useful. FIG. 11 illustrates a mould part having this type of geometry in more detail. A top member 22 is spaced from a carrier member 26 by an intermediate member 24. The top member 22 is rectangular, as seen from the mould cavity. A coil 6 is wound around the carrier member 26 in the manner illustrated in perspective in FIG. 10. A backing member 28, made of e.g. copper, is placed below the carrier member 26, as seen from the top member 22. The first and second edges 56, 58 of the top member 22 are electrically connected to the backing member 28 via conductors 50, 51, so as to form a closed circuit that incorporates the top member 22 and the backing member 28. Each of the conductors 50, 51 may comprise a plurality of leads, spaced at intervals along the respective edges 56, 58 of the top member 22, such that the magnetically induced currents from the first edge 56 to the second edge 58 of the top member 22 will be evenly distributed over the top member 22. Thereby, it is possible to obtain a uniform heating power over the surface of the top member 22. The conductors 50, 51 may also have other designs; for example, they may be implemented as massive copper end pieces, each extending from the top member 22 to the backing member 28 along a side of the carrier member 26, or they may be of a sheet or film type, i.e. have a flat shape, so as to be connected to the respective edges 56, 58 of the top member 22 along a relative large portion of the respective edges 56, 58, which also results in a more uniform distribution of induced currents.

Preferably, the backing member 28 is made of a material that has a low electrical resistivity, i.e. below $1.5*10^{-6}$ Ωm. It is also preferred that the backing member 28 have a low relative magnetic permeability, i.e. less than 1.2. The same applies to the conductors 50, 51, as regards their electrical resistivity and relative magnetic permeability.

As a person skilled in the art readily appreciates, a mould part of the type disclosed above with reference to FIGS. 1-11 can also be used for forming and embossing a surface of a solid object that changes its hardness in response to being heated, for example an object having a surface of a resin or a polymer. A tool for forming a surface, based on the stack structure of a mould part disclosed hereinbefore with reference to FIGS. 1-11, may offer short cycle times as well as efficient heating.

Figure 12:
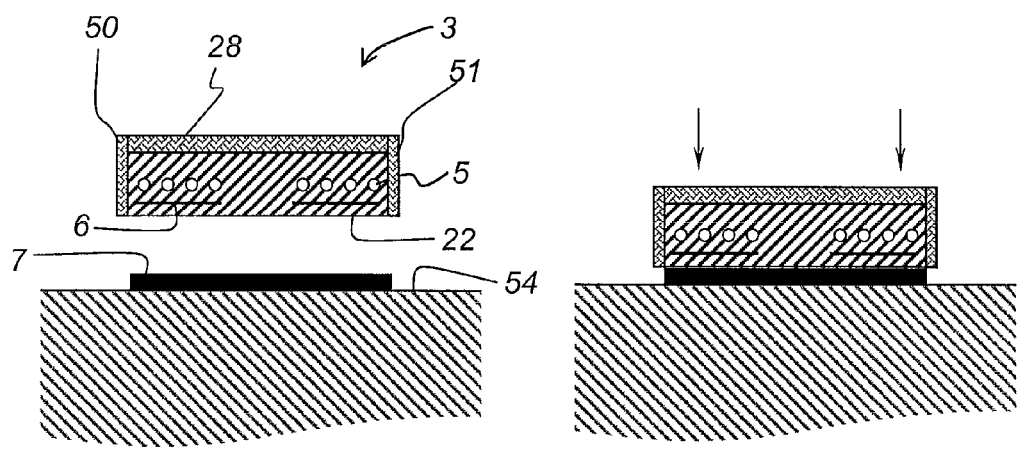
FIGS. 12-13 schematically illustrate an embossing or surface forming process.
Figure 13:
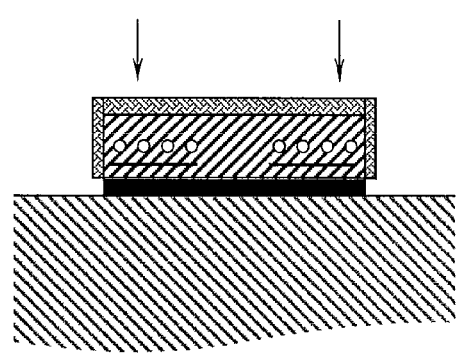

FIGS. 12-13 illustrate a surface forming process, in which a tool 3 for forming a surface is used for shaping the surface of an object 7 that rests on a support 54. The tool 3 comprises an inductive coil 6 having a plurality of windings, for inductively heating a top member 22 at the tool surface. The inductive coil 6 is carried by a carrier member and powered by an oscillator, as described hereinbefore with reference to FIGS. 1-11. Furthermore, as is described hereinbefore, the carrier member is placed behind the top member 22, as seen from the cavity surface, and comprises grooves for accommodating said coil windings, and an intermediate member is placed between the top member 22 and the carrier member. Preferably, the top member 22 has a resistivity lower than $1.5*10^{-6}$ Ωm; the carrier member preferably has a relative magnetic permeability higher than 50 and a resistivity higher than $20*10^{-6}$ Ωm; and the intermediate member preferably has a resistivity higher than $20*10^{-6}$ Ωm and a relative magnetic permeability lower than 1.2. It happens so, however, that many materials that are particularly well suitable for the intermediate member, such as ceramic isolators, have a resistivity that significantly exceeds $20*10^{-6}$ Ωm, as is described hereinbefore. The tool 3 may further include means, in the form of coolant ducts 5, for cooling the tool 3.

End pieces 50, 51 connect the top member 22 to a backing member 28, such that the end pieces 50, 51, the top member 22, and the backing member 28 form a closed electrical circuit that encircles the inductive coil 6. The end pieces 50, 51 and the backing member 28 may consist of, e.g., copper.

The surface forming process comprises a heating step, illustrated in FIG. 12, in which the induction coil 6 is activated so as to heat the top member 22 of the tool 3.

In FIG. 13, a force, indicated by arrows, is applied to the tool 3 in order to press it against the object 7 to be formed. The heat of the top member 22 will thereby melt, or soften, a surface layer of the object 7, such that the surface of the object 7 will be shaped by the surface of the top member 22. The tool 3 is thereafter cooled by the coolant, which may flow continuously through the ducts 5 throughout the process cycle. The force is still applied during this phase.

When the top member 22 and the surface layer of the object 7 have reached a sufficiently low temperature, such that the surface of the object 7 has hardened, the tool 3 is removed from the object 7, and the object 7, now having a desired surface shape, may be replaced with the next object to be formed. Already at this stage the heating of the tool 3 may be resumed to prepare it for the next production cycle. Instead of heating the tool 3 first, and then pressing it against the object 7, it is also possible to press the tool 3 against the object 7 before heating the top member 22.

Depending on the application, the surface of the top member 22 may be shaped so as to imprint a structure in the surface of the object 7. Alternatively, the surface of the top member 22 may be flat, so as to flatten or smooth the surface of the object 7. The tool 3 is particularly well suited for producing surfaces that have a structure on a macroscopic scale, but are smooth on a microscopic scale, e.g. optical surfaces such as Fresnel lenses, light guides, and the like.

Typical resins to be used in an injection molding device, as well as in objects suitable for being formed by the surface forming tool described hereinbefore with reference to FIGS. 12-13, include e.g. polymethyl methacrylate (PMMA), polycarbonate (PC), polyethylene (PE), and polypropylene (PP).

The invention is not restricted to the described embodiments and may be varied within the scope of the appended claims. Features disclosed with reference to specific embodiments may advantageously be combined with other embodiments. For example, features of a mould part disclosed with reference to FIGS. 1-11 may advantageously be combined with the surface forming tool disclosed with reference to FIGS. 12-13, and vice versa.

The invention claimed is:

1. An injection-molding device, comprising:
a tool for forming a surface, the tool comprising a heating device, for heating the tool in the vicinity of a tool surface, said heating device comprising an inductive coil having a plurality of windings and being powered by an oscillator; a top member, at the tool surface, a carrier member, placed behind the top member as seen from the surface to be formed and comprising grooves for accommodating said coil windings, and an intermediate member placed between the top member and the carrier member, wherein
the top member has a resistivity lower than $1.5*10^{-6}$ $\Omega$m,
the carrier member has a relative magnetic permeability higher than 50, and a resistivity higher than $20*10^{-6}$ $\Omega$m, and
the intermediate member has a resistivity higher than $20*10^{-6}$ $\Omega$m and a relative magnetic permeability lower than 1.2.

2. An injection-molding device according to claim 1, wherein the grooves are arranged to convey a coolant, and where the thermal conductivity of the intermediate member is higher than 10 W/mK.

3. An injection-molding device according to claim 1, wherein the intermediate member comprises a ceramic material.

4. An injection-molding device according to claim 3, wherein the ceramic material is Aluminum Nitride, AlN.

5. An injection-molding device according to claim 3, wherein the ceramic material is Boron Carbide, $B_4C$.

6. An injection-molding device according to claim 3, wherein the ceramic material is Silicon Nitride, $Si_3N_4$.

7. An injection-molding device according to claim 3, wherein the ceramic material is Titanium Diboride, $TiB_2$.

8. An injection-molding device according to claim 3, wherein the ceramic material is Aluminum Oxide, $Al_2O_3$.

9. An injection-molding device according to claim 1, wherein a backing member is placed behind the carrier member as seen from the surface to be formed, the coil has return windings that are placed between the carrier member and the backing member, the top member has a resistivity higher than $0.05*10^{-6}$ nm, and the backing member has a resistivity lower than $0.05*10^{-6}$ $\Omega$m.

10. An injection-molding device according to claim 1, wherein the elasticity modulus of the intermediate member is 200 GPa or higher.

11. An injection-molding device according to claim 1, wherein the relative permeability of the top member is higher than 1.2.

12. An injection-molding device according to claim 1, wherein the top member is solid.

13. An injection-molding device according to claim 1, wherein the top member is laminated.

14. An injection-molding device according to claim 13, wherein the top member comprises an upper top member layer having a relative magnetic permeability higher than 1.2 and a lower top member layer having a relative magnetic permeability lower than 1.2.

15. An injection-molding device according to claim 1, wherein the intermediate member comprises grooves facing the grooves of the carrier member.

16. An injection-molding device according to claim 1, wherein said tool for forming the surface comprises at least first and second mould parts defining a mould cavity, at least one of the mould parts comprises said heating device, and said at least one of the mould parts comprises said top member.

17. A tool for forming a surface, comprising a heating device for heating the tool in the vicinity of a tool surface, said heating device comprising an inductive coil having a plurality of windings and being powered by an oscillator; a top member at the tool surface; a carrier member, placed behind the top member as seen from the surface to be formed, and comprising grooves for accommodating said coil windings; and an intermediate member placed between the top member and the carrier member, wherein
the top member has a resistivity lower than $1.5*10^{-6}$ $\Omega$m,
the carrier member has a relative magnetic permeability higher than 50, and a resistivity higher than $20*10^{-6}$ nm, and
the intermediate member has a resistivity higher than $20*10^{-6}$ $\Omega$m and a relative magnetic permeability lower than 1.2.

18. A tool according to claim 17, wherein the top member is electrically connected to a backing member, the backing member being located behind the carrier member, as seen from the surface to be formed.

19. A tool according to claim 17, wherein the relative permeability of the top member is higher than 1.2.

20. A tool according to claim 17, wherein the top member is laminated.

21. A tool according to claim 20, wherein the top member comprises an upper top member layer having a relative magnetic permeability higher than 1.2 and a lower top member layer having a relative magnetic permeability lower than 1.2.

22. A tool according to claim 17, wherein said tool for forming the surface comprises at least first and second mould parts defining a mould cavity, at least one of the mould parts comprises said heating device, and said at least one of the mould parts comprises said top member.

* * * * *